US010823612B2

(12) United States Patent
Sodeoka et al.

(10) Patent No.: US 10,823,612 B2
(45) Date of Patent: Nov. 3, 2020

(54) MULTIFOCAL SPECTROMETRIC MEASUREMENT DEVICE, AND OPTICAL SYSTEM FOR MULTIFOCAL SPECTROMETRIC MEASUREMENT DEVICE

(71) Applicant: JAPAN SCIENCE AND TECHNOLOGY AGENCY, Kawaguchi-shi, Saitama (JP)

(72) Inventors: Mikiko Sodeoka, Itabashi-ku (JP); Katsumasa Fujita, Ibaraki (JP); Jun Ando, Okazaki (JP)

(73) Assignee: JAPAN SCIENCE AND TECHNOLOGY AGENCY, Kawaguchi-shi (JP)

( * ) Notice: Subject to any disclaimer, the term of this patent is extended or adjusted under 35 U.S.C. 154(b) by 420 days.

(21) Appl. No.: 15/547,652

(22) PCT Filed: Jan. 29, 2016

(86) PCT No.: PCT/JP2016/052707
§ 371 (c)(1),
(2) Date: Dec. 11, 2017

(87) PCT Pub. No.: WO2016/121946
PCT Pub. Date: Aug. 4, 2016

(65) Prior Publication Data
US 2018/0136040 A1    May 17, 2018

(30) Foreign Application Priority Data
Jan. 30, 2015  (JP) .................................. 2015-017431

(51) Int. Cl.
*G01J 3/02*        (2006.01)
*G01J 3/36*        (2006.01)
(Continued)

(52) U.S. Cl.
CPC .......... *G01J 3/0216* (2013.01); *G01J 3/0205* (2013.01); *G01J 3/0208* (2013.01); *G01J 3/0221* (2013.01);
(Continued)

(58) Field of Classification Search
CPC ...... G01J 3/0216; G01J 3/0205; G01J 3/0208; G01J 3/0221; G01J 3/0229; G01J 3/0289;
(Continued)

(56) References Cited

U.S. PATENT DOCUMENTS

| 5,866,911 A | 2/1999 | Baer |
| 6,686,582 B1 * | 2/2004 | Volcker ................. B01L 3/5085 |
| | | 250/216 |

(Continued)

FOREIGN PATENT DOCUMENTS

| CA | 2307837 A1 | 5/1999 |
| CA | 2632221 A1 | 5/2007 |

(Continued)

OTHER PUBLICATIONS

Masanari Okuno and Hiroo Hamaguchi, "Tashouten Kyoushouten Raman Bunkou Kenbikyou No Kaihatsu (Development of Multifocal Confocal Raman Spectroscopic Microscope)", Abstract of Oral Presentation No. 1B17 in the Fourth Annual Meeting for Japan Society of Molecular Science (2010), [online], Jul. 2010, Japan Society for Molecular Science, [accessed on Nov. 25, 2014; re-accessed on Jan. 29, 2016}, the Internet <URL: http://molsci.center.ims.ac.jp/area/2010/bk2010/papers/1B17_w.pdf>.
(Continued)

*Primary Examiner* — Dominic J Bologna
(74) *Attorney, Agent, or Firm* — Oliff PLC

(57) ABSTRACT

A multifocal spectrometric device is capable of simultaneously performing a measurement of a plurality of sample with high sensitivity, with no restriction on the magnifica-
(Continued)

tion. A multifocal spectrometric device is a device in which beams of signal light emitted from a plurality of predetermined observation areas on samples placed in a sample placement section are introduced into a spectrograph and thereby dispersed into spectra, the device including: a plurality of objective lenses (objective light-condensing sections) individually located at positions which respectively and optically face the plurality of observation areas; and spectrograph input sections provided in such a manner that each of the plurality of objective lenses has one corresponding spectrograph input section, for introducing signal light passing through the corresponding objective lenses into the spectrograph. Since each objective lens only needs to observe one observation area, both the magnification and the numerical aperture can be simultaneously increased.

16 Claims, 9 Drawing Sheets

(51) Int. Cl.
| | | |
|---|---|---|
| *G01N 21/65* | (2006.01) | |
| *G01N 21/03* | (2006.01) | |
| *G01J 3/18* | (2006.01) | |
| *G01N 21/64* | (2006.01) | |
| *G01J 3/44* | (2006.01) | |

(52) U.S. Cl.
CPC .......... *G01J 3/0229* (2013.01); *G01J 3/0289* (2013.01); *G01J 3/0294* (2013.01); *G01J 3/18* (2013.01); *G01J 3/36* (2013.01); *G01J 3/44* (2013.01); *G01J 3/4406* (2013.01); *G01N 21/03* (2013.01); *G01N 21/64* (2013.01); *G01N 21/6458* (2013.01); *G01N 21/65* (2013.01)

(58) Field of Classification Search
CPC .... G01J 3/0294; G01J 3/18; G01J 3/36; G01J 3/44; G01N 21/03; G01N 21/64; G01N 21/6458; G01N 21/65
See application file for complete search history.

(56) References Cited

U.S. PATENT DOCUMENTS

| | | | | |
|---|---|---|---|---|
| 7,170,597 | B1* | 1/2007 | Hooper | ............... G01N 21/6458 |
| | | | | 356/317 |
| 2005/0264776 | A1* | 12/2005 | Baer | ................ A45D 26/0014 |
| | | | | 355/43 |
| 2007/0114362 | A1* | 5/2007 | Feng | .................. G01N 21/6428 |
| | | | | 250/208.1 |
| 2010/0324834 | A1 | 12/2010 | Treptow et al. | |
| 2011/0101243 | A1* | 5/2011 | Wimberger-Friedl | ..................... |
| | | | | G01N 21/6452 |
| | | | | 250/459.1 |
| 2011/0222051 | A1* | 9/2011 | Heng | ................. G01N 15/1475 |
| | | | | 356/73 |

FOREIGN PATENT DOCUMENTS

| | | | |
|---|---|---|---|
| CA | 2792628 | A1 | 9/2011 |
| CN | 101361015 | A | 2/2009 |
| CN | 101821609 | A | 9/2010 |
| CN | 102077080 | A | 5/2011 |
| DE | 19748211 | A1 | 5/1999 |
| EP | 2163885 | A1 | 3/2010 |
| JP | 2001-508340 | A | 6/2001 |
| JP | 2002-514739 | A | 5/2002 |
| JP | 2004-504594 | A | 2/2004 |
| JP | 2006-526779 | A | 11/2006 |
| JP | 2009-517662 | A | 4/2009 |
| JP | 2010-151801 | A | 7/2010 |
| JP | 2011-117901 | A | 6/2011 |
| JP | 2011-525629 | A | 9/2011 |
| JP | 2012-229922 | A | 11/2012 |
| JP | 2012-237647 | A | 12/2012 |
| JP | 2013-522629 | A | 6/2013 |
| KR | 10-0527535 | B1 | 11/2005 |
| WO | 96/06369 | A2 | 2/1996 |
| WO | 1998/030889 | A1 | 7/1998 |
| WO | 99/23474 | A1 | 5/1999 |
| WO | 2002/006796 | A2 | 1/2002 |
| WO | 2004/090505 | A2 | 10/2004 |
| WO | 2007/062039 | A2 | 5/2007 |
| WO | 2009/027102 | A2 | 3/2009 |
| WO | 2009/156942 | A1 | 12/2009 |
| WO | 2011/116003 | A1 | 9/2011 |

OTHER PUBLICATIONS

Apr. 19, 2016 International Search Report issues in International Application No. PCT/JP2016/052707.
May 9, 2017 International Preliminary Report on Patentability issued in International Application No. PCT/JP2016/052707.
Antony Orth and Kenneth Crozier, "Gigapixel Fluorescence Microscopy With a Water Immersion Microlens Array" Optics Express, vol. 21, No. 2, pp. 2361-2368, Jan. 28, 2013.

* cited by examiner

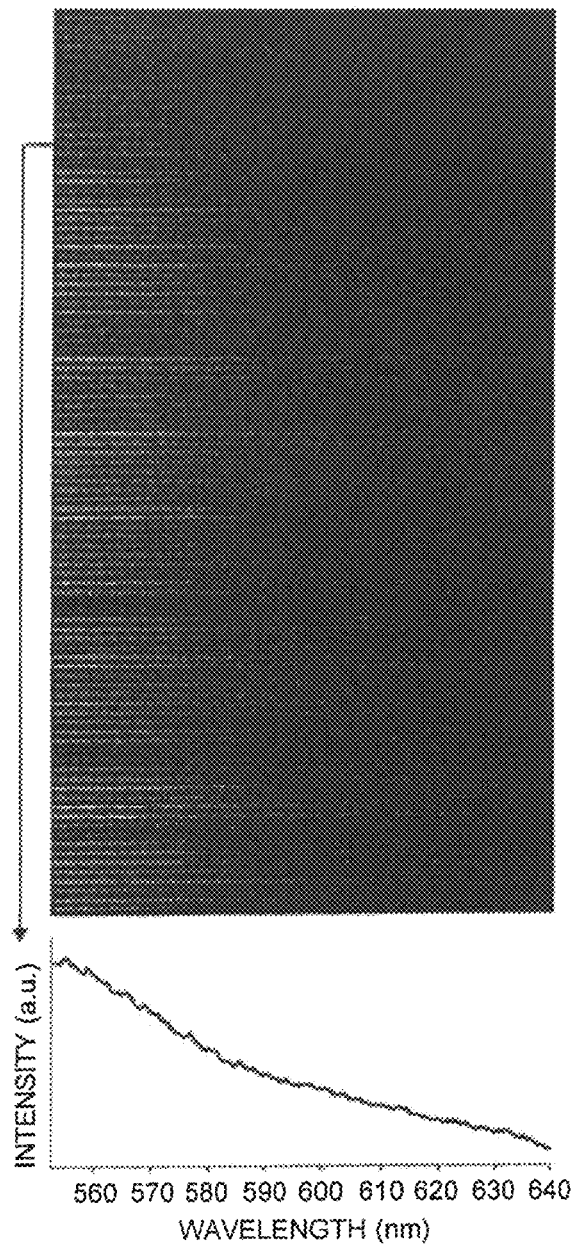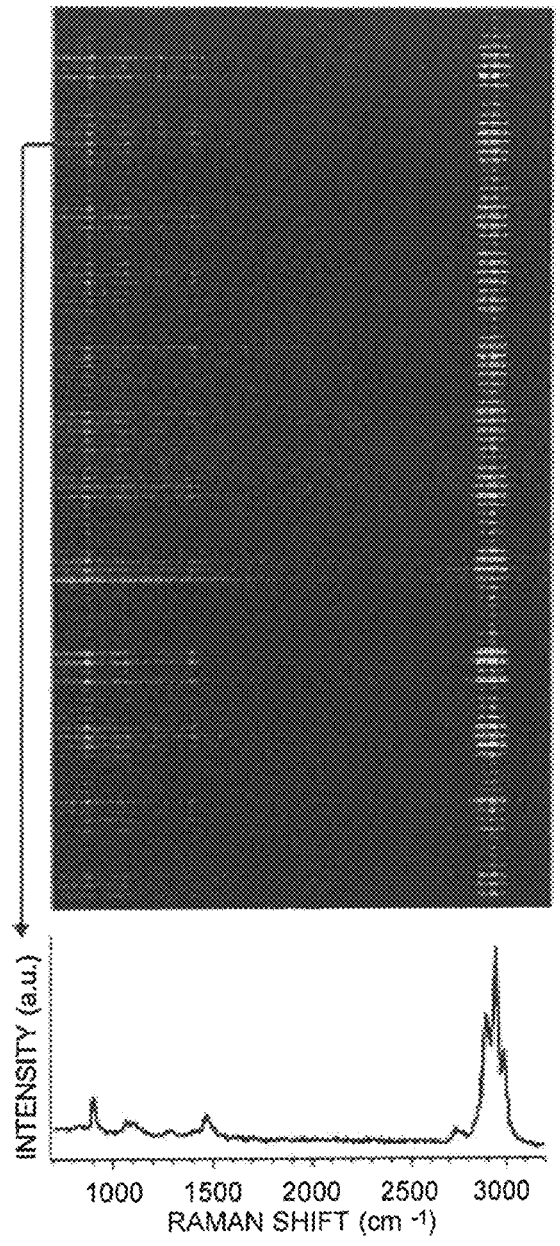

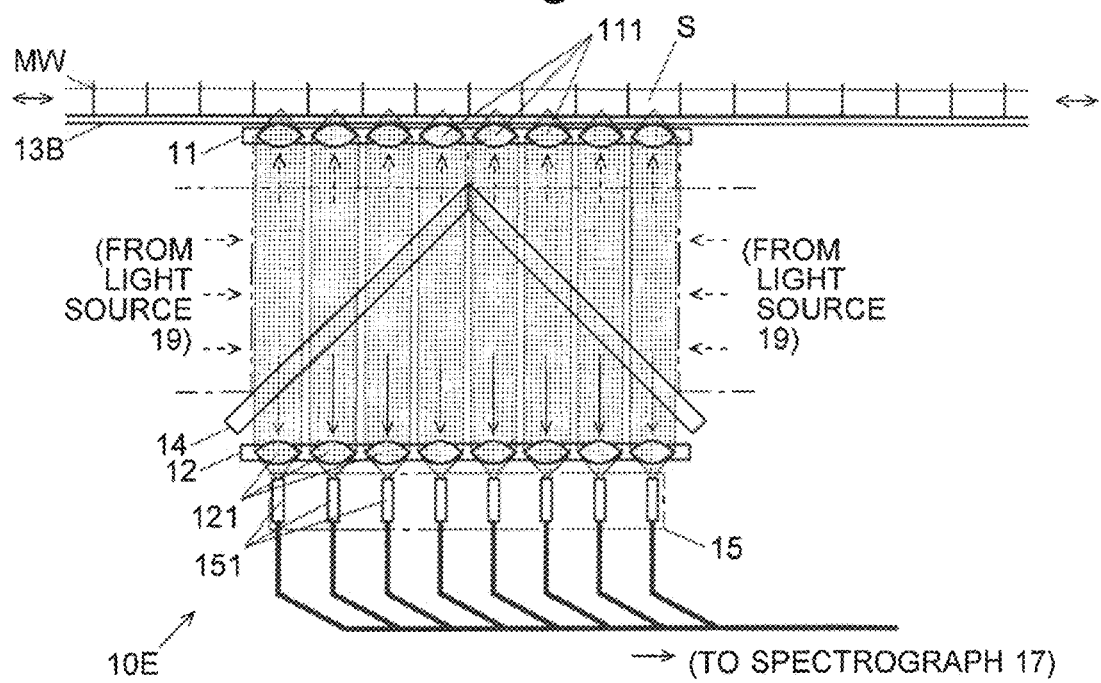
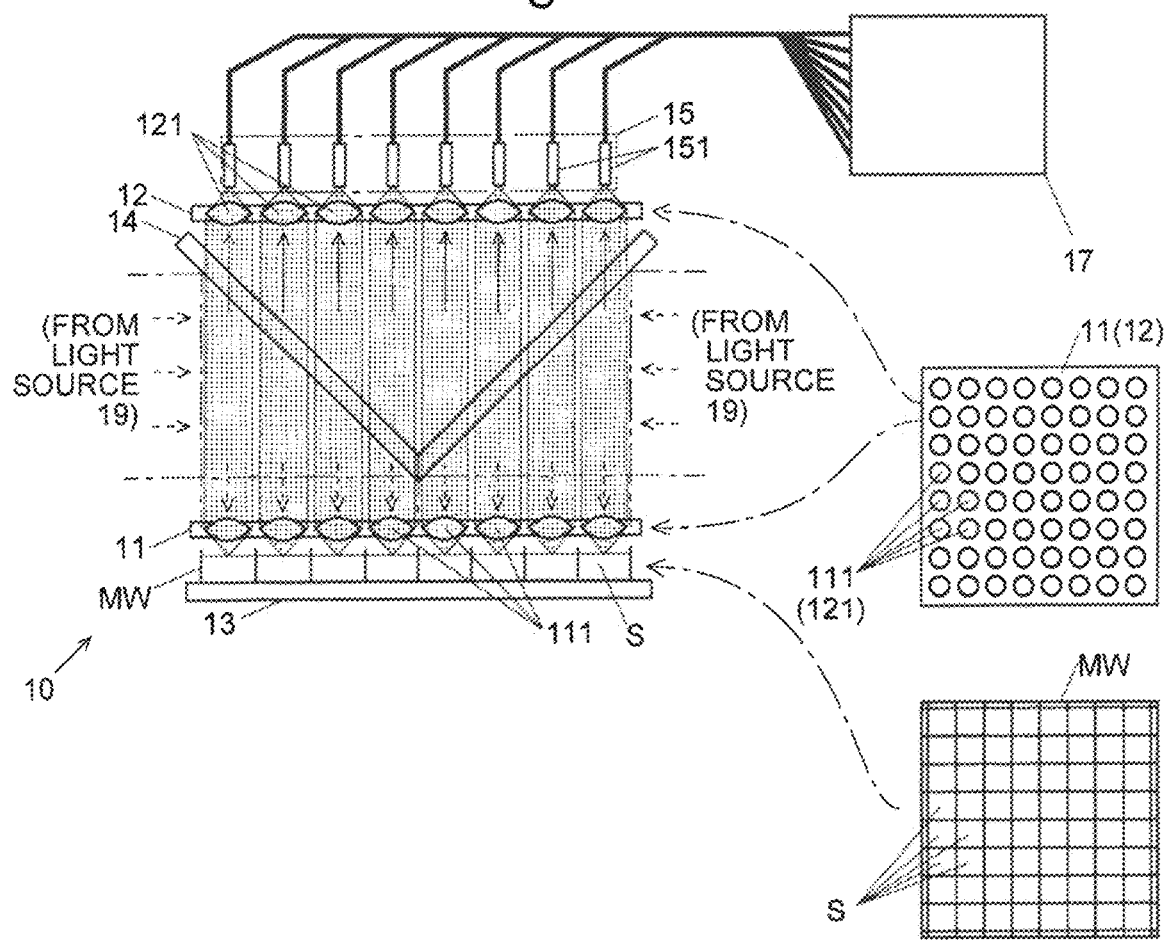

*PH1 AND PH2 ARE DISPLACED IN THE DIRECTION PERPENDICULAR TO THE PLANE OF PAPER.

MULTIFOCAL SPECTROMETRIC MEASUREMENT DEVICE, AND OPTICAL SYSTEM FOR MULTIFOCAL SPECTROMETRIC MEASUREMENT DEVICE

TECHNICAL FIELD

The present invention relates to a multifocal spectrometric measurement device for simultaneously measuring beams of signal light, such as fluorescence or Raman scattering light, coming from a plurality of points, as well as an optical system for such a multifocal spectrometric measurement device.

BACKGROUND ART

In recent years, a simultaneous multi-sample measurement method, called the "high throughput screening" (HTS), for analyzing a number of samples within a short period of time has been attracting attention in pharmaceutical and other areas. In the simultaneous multi-sample measurement method, a spectrometric measurement is widely used, in which signal light emitted from each sample is dispersed to obtain a spectrum for each sample, and the composition, molecular structure and other aspects of the samples are analyzed from their respective spectra. Examples of the signal light include: fluorescence or Raman scattering light emitted from each sample when the sample is irradiated with irradiation light; and chemiluminescent light emitted from a sample without irradiating the sample with light.

Patent Literature 1 and Non Patent Literature 1 disclose a multifocal spectrometric measurement device. Although these documents contain no description on the simultaneous multi-sample spectrometric measurement method, the device is potentially applicable for the simultaneous multi-sample spectrometric measurement method. It is a type of device called the "Raman spectroscopic microscope". In this device, the irradiation light is divided into a plurality of beams with a microlens array (which will be described later). The irradiation beams are delivered to different positions on a single sample, and Raman scattering light obtained at each position is dispersed into a spectrum. By mapping the intensity of the Raman scattering light having a specific amount of Raman shift, an image showing the distribution of a sample component corresponding to the Raman shift is obtained. This device may possibly be applied for a simultaneous measurement of a plurality of samples by casting each irradiation beam onto a different sample instead of delivering those beams to different positions on a single sample.

The multifocal spectrometric measurement device disclosed in Patent Literature 1 and Non Patent Literature 1 is hereinafter described in detail using FIG. 15. In this multifocal spectrometric measurement device 90, a laser beam generated by a laser source 91 is divided into a plurality of light fluxes with a microlens array 92 having microlenses 921 arranged in a matrix form with eight rows and eight columns. Each of those light fluxes is reflected by an edge filter 93 and passes through a pinhole array 94 having one hole provided for each light flux, as well as a relay lens 95 and an objective lens 96, which are common to an light fluxes, to be eventually cast onto the sample S. From this sample S, the same number of beams of signal light as the light fluxes produced by dividing the irradiation light are emitted. In each beam of signal light, the reflected light which has the same wavelength as the irradiation light, and the Raman scattering light which has a different wavelength from the irradiation light, are superposed on each other. The beams of signal light travel through the objective lens 96, relay lens 95 and holes of the pinhole array 94, reaching the edge filter 93. Due to the difference in wavelength, the reflected light is reflected by the edge filter 93 and cannot pass through; only the Raman scattering light is allowed to pass through. After passing through the edge filter 93, the fluxes of the Raman scattering light pass through a lens system 97 consisting of a pair of lenses and enter a fiber bundle 98 which has the same number of optical fibers as the microlenses 921 bundled in homeomorphic relation to the microlens array 92. The inlet ends of the optical fibers in the fiber bundle 98 are arranged in a matrix form, with each inlet end receiving one flux of Raman scattering light. The outlet ends of the fiber bundle 98 are arranged in a row. The light exiting from each outlet end is individually dispersed into a spectrum by a spectrograph 99.

Patent Literature 2 discloses a simultaneous multipoint spectrometric measurement device, in which: irradiation light is cast from a single objective lens onto a sample S; the signal light (Raman scattering light) emitted from the sample S is received by a plurality of optical fibers in a fiber bundle; and the light exiting from the output end of each optical fiber is individually dispersed into a spectrum by a spectrograph. This device differs from the one disclosed in Patent Literature 1 and Non Patent Literature 1 in that the irradiation light is not divided, and the signal light is also not divided until it reaches the fiber bundle. Patent Literature 2 also includes no description on the simultaneous multi-sample measurement method.

CITATION LIST

Patent Literature

Patent Literature 1: JP 2012-237647 A
Patent Literature 2: JP 2010-151801 A

Non Patent Literature

Non Patent Literature 1: Masanari Okuno and Hiroo Hamaguchi, "Tashouten Kyoushouten Raman Bunkou Kenbikyou No Kaihatsu (Development of Multifocal Confocal Raman Spectroscopic Microscope)", Abstract of Oral Presentation No. 1B17 in the Fourth Annual Meeting for Japan Society of Molecular Science (2010), [online], July 2010, Japan Society for Molecular Science, [accessed on Nov. 25, 2014; re-accessed on Jan. 29, 2016], the Internet

SUMMARY OF INVENTION

Technical Problem

The signal light generated from a sample is isotropically emitted in a spherical form. Therefore, an objective lens can collect only a portion of the entire signal light. However, the collection efficiency of the signal light should be as high as possible for a high-sensitivity measurement. Since the collection efficiency becomes higher as the numerical aperture NA of the objective lens becomes larger, a microscopic optical system having a high numerical aperture (NA) is required. In the case of analyzing a number of samples using a microscopic optical system, the microspectroscopic measurement is simultaneously performed for multiple points by (i) sequentially performing the microspectroscopic measurement while scanning the sample with a single focal point, or (ii) simultaneously performing the microspectroscopic measurement on multiple points by a multifocal system as in Patent Literature 1 and Non Patent Literature 1. In case (i), the measurement time increases with the number of samples. In particular, for a faint light as in the Raman spectroscopy, a long exposure time is required, so that an enormous amount of time is needed for the spectrometric measurement of all samples. In case (ii), increasing the numerical aperture NA of the objective lens causes an increase in the magnification of the lens, which reduces the observable area on the sample. That is to say, there is a trade-off relationship between the numerical aperture NA and the magnification of the objective lens, which also means that there is a trade-off relationship between the measurement sensitivity and the size of the observable area.

The multipoint spectrometric measurement device disclosed in Patent Literature 1 and Non Patent Literature 1 is aimed at obtaining Raman scattering light from a plurality of different positions within a single sample. Therefore, the area to be observed is comparatively small. Since the size of the area to be observed in this device is approximately one dozen μm square, there is no problem With the measurement sensitivity as far as the aforementioned aim is concerned. However, a device to be applied in a simultaneous measurement of multiple samples needs to observe a larger area. As a specific example, a sample holder called the "multiwell", which is commercially offered for simultaneous multi-sample measurements, has several tens to several hundreds of wells for holding individual samples arranged in a matrix form, with the entire area measuring approximately a several cm to one dozen cm each side. In order to observe the entire area of such a multiwell through a single objective lens as used in the device disclosed in Patent Literature 1 and Non Patent Literature 1, the objective lens must have a low magnification, which lowers the measurement sensitivity. Therefore, this device is not suitable for simultaneous multi-sample measurements.

The problem to be solved by the present invention is to provide a multifocal spectrometric measurement device capable of performing a simultaneous multi-sample measurement with high sensitivity and with no restriction on the magnification, as well as an optical system for such a multifocal spectrometric measurement device.

Solution to Problem

The multifocal spectrometric measurement device according to the present invention developed for solving the previously described problem is a device in which beams of signal light emitted from a plurality of predetermined observation areas on a sample or samples placed in a sample placement section are introduced into a spectrograph and thereby dispersed into spectra, the device including:

a plurality of objective light-condensing sections individually located at positions which respectively and optically face the plurality of observation areas; and spectrograph input sections provided in such a manner that each of the plurality of objective light-condensing sections has one corresponding spectrograph input section, for introducing signal light passing through the corresponding objective light-condensing sections into the spectrograph.

The "positions which optically face observation areas" are positions at which beams of signal light from the observation areas arrives. If no other optical element, such as a fight-condensing section or reflector, is present between the observation areas and the objective light-condensing sections, those positions are positions which (literally) face the observation areas. If such an optical element (e.g. a magnification-converting section which will be described later) is present between the observation areas and the objective light-condensing sections, those positions are positions at which the signal light arrives after passing through that optical element.

In the multifocal spectrometric measurement device according to the present invention, the plurality of objective light-condensing sections are provided so that one objective light-condensing section optically faces one observation area in the sample. The plurality of observation areas may be entirely included in one sample, or they may be distributed over a plurality of samples; having a single observation area on each sample is also possible. In any case, one objective light-condensing section corresponds to one observation area. Each objective light-condensing section collects signal light from the observation area which optically faces that section. The signal light collected by each objective light-condensing section is sent to the corresponding spectrograph input section. Thus, a spectrometric measurement of the signal light is performed for each observation area. Each spectrograph input section may be placed so that it (literally) faces the corresponding objective light-condensing section, or there may be some optical element (e.g. another light-condensing section, reflector or the like) placed in the space between the objective light-condensing sections and the spectrograph input sections, as in the space between the observation areas and the objective light-condensing sections.

The numerical aperture NA of a lens is defined as $NA = n \cdot \sin\theta$, where $\theta$ is the maximum angle made by the light incident on the lens from the focal point with respect to the optical axis, and n is the refractive index of the medium which is present between the focal point and the lens. Similarly, the numerical aperture NA of a light-condensing section can be defined as $NA = n \cdot \sin\theta'$, where $\theta'$ is the angular radius of the light-condensing section as viewed from the point where the light condensed by the light-condensing section is focused (focal point), and n is the refractive index of the medium which is present in the intermediate area.

By the present invention, a number of samples or a large-size sample can be simultaneously observed, since each objective light-condensing section only needs to observe a single observation area. Therefore, it is possible to lower the magnification, i.e. to increase the area of the observable area, as well as to increase the numerical aperture NA of the individual objective light-condensing section, i.e. to improve the measurement sensitivity.

The multifocal spectrometric measurement device according to the present invention may preferably be configured as follows: at each of some or all of the plurality of objective light-condensing sections, a spectrograph-side light-condensing section is provided between the objective light-condensing section and the corresponding spectrograph input section, a point in the observation area optically facing the objective light-condensing section is located at the position on which the signal light between the objective light-condensing section and the spectrograph-side light-condensing section is focused after passing through the objective light-condensing section, and the spectrograph input section corresponding to the objective light-condensing section is located at the position on which the signal light is focused after passing through the spectrograph-side light-condensing section. This configuration resolves the trade-off between the numerical aperture NA and the magnification, making it possible to optimize the measurement sensitivity with no restriction on the numerical aperture NA of the objective light-condensing section, numerical aperture NA of the spectroscope-side light-condensing section, size of the measurement area, and intervals of the measurement points. That is to say, since the numerical aperture NA of the objective light-condensing section can be increased independently of the magnification, the collection efficiency of the signal light can be improved, and furthermore, since the numerical aperture NA of the spectrograph-side light-condensing section can also be set independently of the magnification, the collected signal light can efficiently enter the spectrograph with an optimum numerical aperture NA which yields high utilization efficiency. For these reasons, the signal light from the observation areas can be efficiently introduced to the spectrograph input sections. Furthermore, since the trade-off between the numerical aperture NA and the magnification is resolved, the size and interval of the beams of signal light to be incident on the spectrograph can also be suitably determined for the configuration of the spectrograph, which allows the measurement points to be increased as needed even when the same spectrograph is used. These favorable effects cannot be achieved by conventional imaging optical systems as shown in FIG. 15.

As in the case of the fluorescence or Raman scattering light, if the signal light is obtained by irradiating a sample with irradiation light having a predetermined wavelength, the multifocal spectrometric measurement device according to the present invention should include a light source for casting the irradiation light onto the sample or samples. The light source may be placed at a position from which the irradiation light is cast through the objective light-condensing sections onto the sample, or at a position from which the irradiation light is cast onto the sample without passing through the objective light-condensing sections.

As in the case of the signal light generated by chemiluminescence, if the signal light is obtained without irradiating the sample with light, it is unnecessary to provide the multifocal spectrometric measurement device according to the present invention with a light source for casting the irradiation light onto the sample or samples.

The arrangement of the plurality of observation areas, and that of the objective light-condensing sections which optically face the respective observation areas, may be either a one-dimensional or two-dimensional arrangement. The observation areas and the objective light-condensing sections may be arranged either at regular or irregular intervals. If the observation areas and the objective light-condensing sections are arranged in a two-dimensional form, they may be arranged either at random or in an ordered form, such as a square lattice (matrix), triangular lattice or radial form. In the case of using a multiwell in which a number of wells for holding individual samples are arranged in a matrix form as mentioned earlier, the multifocal spectrometric measurement device according to the present invention may preferably include an objective-light-condensing-section array in which the plurality of objective light-condensing sections are arranged in a matrix form. In the case of using this objective-light-condensing-section array along with the spectrograph-side light-condensing sections, the device may preferably include a spectrograph-side light-condensing-section array in which the plurality of spectrograph-side light-condensing sections are arranged in a matrix form, with each spectrograph-side light-condensing section optically facing one objective light-condensing section.

In the multifocal spectrometric measurement device according to the present invention, if the above configuration is simply used, not only the signal light but also the irradiation light reflected by the sample can enter the spectrograph input sections. The irradiation light entering the spectrograph can be removed by analytical processing. However, if the signal light is Raman scattering light, the signal light has a different wavelength from that of the irradiation light, and therefore, it is possible to remove only the irradiation light by a filter. The same also applies in the case of the fluorescence emission whose wavelength differs from that of the irradiation light. That is to say, the multifocal spectrometric measurement device according to the present invention may include a filter placed between the sample placement section and the spectrograph input sections, for allowing light having a wavelength of the signal light to pass through while reflecting light having a wavelength of the irradiation light, along with the light source for casting the irradiation light onto the sample or samples.

The irradiation light to be incident on the filter may be a single beam. However, the filter may preferably be arranged so that a plurality of beams of the irradiation light are incident on the filter and each of the plurality of beams of the irradiation light reflected by the filter is cast onto a different subset of the objective light-condensing sections. The plurality of beams of the irradiation light may be generated from a plurality of different light sources, or they may be generated by providing multiple paths from a single source of light. The use of the plurality of beams of the irradiation light allows for the reduction of the size of the filter, which is advantageous for improving the surface accuracy of the filter and reducing the production cost as compared to the use of a single irradiation beam and a large-area filter. If a plurality of different light sources is used to generate a plurality of beams of the irradiation light, it is possible to deliver a stronger irradiation beam to each sample and thereby improve the sensitivity of the spectrometric measurement.

In the present invention, it is not always necessary to deliver one separate irradiation beam to each sample; casting a single irradiation beam on the entire area of the sample or samples is also possible. However, it is preferable to adopt the configuration that the filter is arranged between the objective light-condensing sections and the spectrograph input sections so that the irradiation light cast from the light source is reflected by the filter into the direction of the optical axes of the objective light-condensing sections. This configuration makes the irradiation light be condensed on the observation areas through the objective light-condensing sections, so that the irradiation light will be exhaustively utilized.

The multifocal spectrometric measurement device according to the present invention may include a magnification-converting section placed between the plurality of observation areas and the plurality of objective light-condensing sections, for changing the size of an image formed by the signal light from each of the plurality of observation areas. By using the magnification-converting section, measurements of a number of small observation areas can be simultaneously performed. Similarly, the multifocal spectrometric measurement device according to the present invention may include a spectrograph-input-section-side magnification-converting section placed between the plurality of objective light-condensing sections and the spectrograph input sections, for changing the size of an image formed by the signal light from each of the plurality of objective light-condensing sections. As the magnification-converting section and the spectrograph-input-section-side magnification-converting section, a light-condensing section consisting of a single lens (or the like) or a light-condensing section consisting of a set of lenses (or the like) arranged in the propagating direction of the signal light can be used.

The multifocal spectrometric measurement device according to the present invention may also be configured as follows:

the spectrograph input sections are arranged at matrix points in such a manner that each of the plurality of objective light-condensing sections has one corresponding spectrograph input section; and the rows and columns of the matrix are non-parallel to the wavelength-dispersing direction of a dispersing element included in the spectrograph. A diffraction grating, prism or similar element can be used as the dispersing element. By this configuration, beams of diffracted light can be produced from the respective beams of signal light by means of a single dispersing element without overlapping each other. This spectrometric optical system can be used not only as the optical system for the multifocal spectrometric measurement device according to the present invention, but can also be used, for example, in the devices described in Patent Literature 1 or 2.

The multifocal spectrometric measurement device according to the present invention may include a moving means for changing the relative position of the sample or samples and the plurality of objective light-condensing sections along a plane containing the sample or samples placed in the sample placement section. This allows for an observation of the sample over a larger area than in the case where no such moving means is used, making it possible to perform a spectrometric imaging operation for creating an image which shows spectrometric data. The change in the relative position of the sample and the plurality of objective light-condensing sections may be made in a linear (one-dimensional), planer (two-dimensional) or steric (three-dimensional) form.

The optical system for a multifocal spectrometric measurement device according to the present invention is an optical system to be used in a device in which beams of signal light emitted from a plurality of predetermined observation areas on a sample or samples placed in a sample placement section are introduced into a spectrograph and thereby dispersed into spectra, the optical system including:

a plurality of objective light-condensing sections configured to be installed in the device in such a manner as to be individually placed at positions which respectively and optically face the plurality of observation areas.

Advantageous Effects of the Invention

By the present invention, a multifocal spectrometric measurement device capable of simultaneously performing a measurement of multiple samples or a large sample with high sensitivity and with no restriction on the magnification can be obtained.

BRIEF DESCRIPTION OF DRAWINGS

FIGS. 4A and 4B are CCD images and graphs showing the results of a fluorescence spectrum measurement (FIG. 4A) and Raman spectrum measurement (FIG. 4B) performed using the multifocal spectrometric measurement device in the first embodiment.

FIG. 10 is a schematic configuration diagram showing the sixth embodiment of the multifocal spectrometric measurement device according to the present invention.

FIG. 11 is a schematic configuration diagram showing a variation of the first embodiment.

DESCRIPTION OF EMBODIMENTS

Embodiments of the multifocal spectrometric measurement device according to the present invention are hereinafter described using FIGS. 1-14C.

Figure 1:
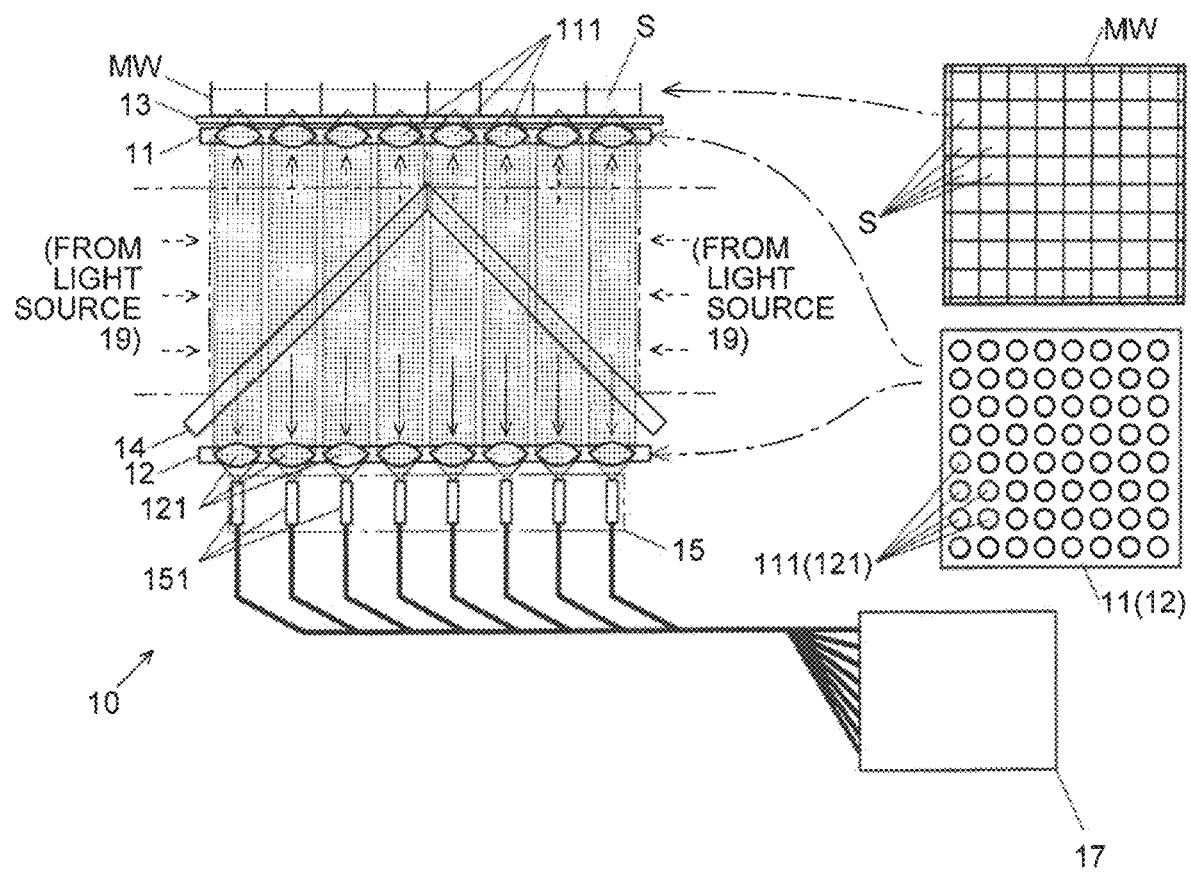
FIG. 1 is a schematic configuration diagram showing the first embodiment of the multifocal spectrometric measurement device according to the present invention.

(1) Multifocal Spectrometric Measurement Device According to First Embodiment (1-1) Configuration of Multifocal Spectrometric Measurement Device According to First Embodiment As shown in FIG. 1, the multifocal spectrometric measurement device 10 according to the first embodiment has a sample holder 13 on which a multiwell having wells for holding samples S arranged in a matrix form is mounted. The bottom wall of the multiwell MW and the sample holder 13 are made of glass which is transparent to both irradiation light and signal light. An objective lens array (objective light-condensing-section array) 11 having a plurality of objective lenses (objective light-condensing sections) 111 arranged in a matrix form is provided, facing the sample holder 13. The plurality of objective lenses 111 are provided in such a manner that each objective lens 111 faces one well when the multiwell MW is held on the sample holder 13. Each of those wells becomes an observation area for one sample S. Each objective lens 111 is arranged in such a manner that, when a parallel beam as the signal light is incident on the lens from the side opposite to the sample holder 13, the lens focuses the beam on a point within the well which faces the lens in the multiwell MW held on the sample holder 13.

The multifocal spectrometric measurement device 10 also has a second lens array (spectrograph-side lens array; spectrograph-side light-condensing-section array) 12 facing the objective lens array 11. The second lens array 12 has second lenses (spectrograph-side lenses; spectrograph-side light-condensing sections) 121 arranged in a matrix form in such a manner that each of the objective lenses 111 has one second lens 121 facing.

The multifocal spectrometric measurement device 10 further includes spectrograph input sections 151 provided in such a manner that each of the second lenses 121 has one spectrograph input section 151 facing. Each individual spectrograph input section 151 consists of the input end of one optical fiber. Each spectrograph input section 151 is placed at a position where signal light (parallel beam) which falls from the side opposite to the spectrograph input section 151 onto the second lens 121 correspondingly facing this section is focused. Those spectrograph input sections 151 arranged in a matrix firm and facing the second lenses 12 constitute the spectrograph-input-section assembly 15. The output ends of all optical fibers are arranged in a row in such a manner that the beams of light from those output ends are cast at different positions on the surface of a diffraction grating in a spectrograph 17.

Between the objective lens array 11 and the second lens array 12, a filter 14 is provided which allows light having wavelengths within a predetermined wavelength band to pass through while reflecting light having wavelengths within other wavelength bands. The predetermined wavelength band mentioned earlier does not include the wavelength of the irradiation light but includes the wavelength of the signal light. Accordingly, the filter 14 reflects the irradiation light while allowing the signal light to pass through. The filter 14 consists of two quadrilateral plate members. One plate member covers one half of the columns of the objective lenses 111 (in FIG. 1, four columns on the left side) and is tilted at an angle of 45 degrees to the optical axes of the objective lenses 111, with its distance from the objective lens array 11 being larger at the end of the columns of the objective lenses 111 than at the center of the objective lens array 11. The other plate member covers the other half of the columns of the objective lenses 111 (in FIG. 1, four columns on the right side) and is tilted at an angle of 90 degrees to the former plate member (and 45 degrees to the optical axes of the objective lenses 111).

Figure 2:
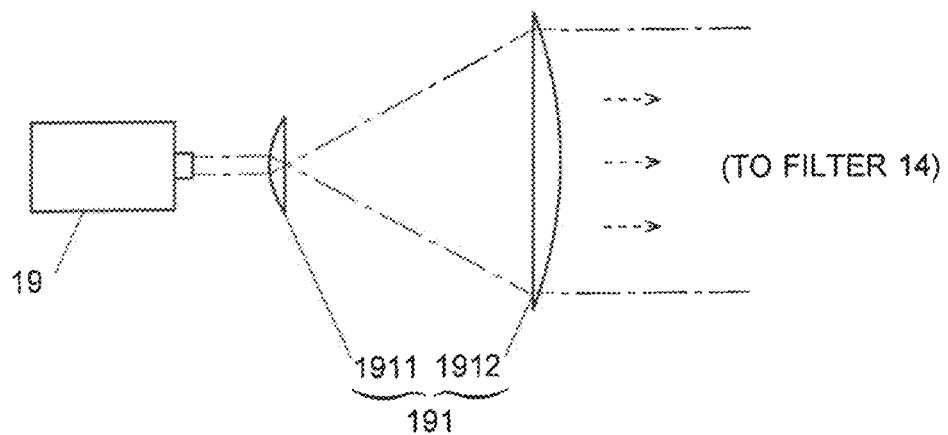
FIG. 2 is a schematic configuration diagram showing the light source and beam-diameter-increasing optical system used in the first embodiment.

The multifocal spectrometric measurement device 10 in the present embodiment has two light sources (laser sources) 19 of the irradiation light. As shown in FIG. 2, each light source 19 is provided with a diameter-increasing optical system 191, which includes a diameter-increasing lens 1911 for increasing the diameter of the laser light from the light source 19 and a parallel beam formation lens 1912 for collimating the laser light whose diameter has been increased by the diameter-increasing lens 1911 into a parallel beam. One of the two light sources 19 is arranged so as to cast the laser beam onto one of the plate members of the filter 14 from the direction at an angle of 90 degrees to the optical axes of the objective lenses 111 (in FIG. 1, from the left side). The other light source 19 is arranged so as to cast the laser beam onto the other plate member of the filter 14 from the direction at an angle of 90 degrees to the optical axes of the objective lenses 111 (in FIG. 1, from the right side).

The objective lenses 111 shown in FIG. 1 are arranged in eight rows and eight columns. The number of objective lenses 111 is not limited to this shown example. For example, a commercially available multiwell has wells arranged in 16 rows and 24 columns, with a total of 384 wells (24×16). In the case where each of all wells in this multiwell is used as an observation area, the objective lenses 111 can also be arranged in 16 rows and 24 columns. The second lenses 121 and the spectrograph input sections 151 should also be similarly arranged. The entire size of this commercially available multiwell is 72 mm by 108 mm. Its area is approximately $10^7$ times as large as the entire observation area in the case of Patent Literature 1, which is approximately one dozen μm square.

Figure 3:
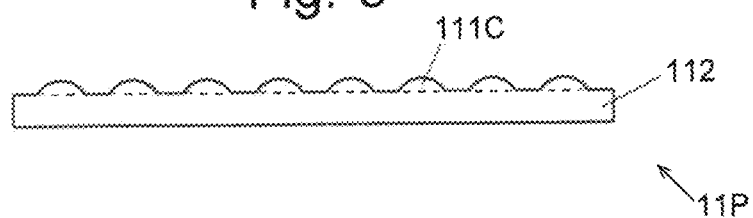
FIG. 3 is a vertical sectional view of another example of a lens array.

In FIG. 1, each of the individual objective lenses 111 in the objective lens array 11 is independently provided. FIG. 3 shows another possible example, in which a plurality of convex portion 111C are provided on the surface of a plate 112 which is transparent to both irradiation light and signal light. In this configuration, the individual convex portions 111C can be used as objective lenses. The plate 112 and the plurality of convex portions 111C forming a single part care be handled as an objective lens array 11P. The second lens array 12 can also be similarly created.

(1-2) Operation of Multifocal Spectrometric Measurement Device According to First Embodiment An operation of the multifocal spectrometric measurement device 10 according to the first embodiment is hereinafter described.

A sample S is placed in each well of the multiwell MW. This multiwell MW is held on the sample holder 13. In this state, irradiation light (laser light) is cast from each of the two light sources 19 through the diameter-increasing optical system 191 onto the entire surface of the corresponding plate member of the filter 14. The irradiation light is represented by arrowed broken lines on the optical paths in the figure. The irradiation light is reflected by the filter 14 into the direction parallel to the optical axes of the objective lenses 111 and falls onto all objective lenses 111. At each objective lens 111, the irradiation light is focused on the well (Observation area) which faces the lens. Thus, the light is cast onto the sample S.

The sample S absorbs the energy of the irradiation light, or scatters the irradiation light, emitting signal light, such as fluorescence or Raman scattering light, whose wavelength differs from that of the irradiation light. The signal light is represented by arrowed solid lines on the optical paths in the figure. The signal light emitted from each sample S is collected by the objective lens 111 facing the well (observation area) which holds that sample. The signal light collected by each objective lens 111 is collimated into a parallel beam, which passes through the filter 14 and falls onto the second lens 121. The objective lens 111 collects not only the signal light but also the irradiation light reflected by the sample S (reflected light). However, this reflected light is removed by the filter 14 and does not fall onto the second lens 121.

The signal light incident on each second lens 121 is focused on the spectrograph input section 151 which respectively faces the lens, i.e. on the input end of an optical fiber, and is cast from the output end of the same optical fiber onto the spectrograph 17. Each signal light is diffracted on the surface of the diffraction grating in the spectrograph 17 and dispersed into a spectrum in which each wavelength is located at a different position on the light-receiving surface of a detector.

In the multifocal spectrometric measurement device 10 according to the first embodiment, each individual objective lens 111 observes a single well (observation area). As compared to the case of using a single objective lens to observe all observation areas, the area to be observed through each individual objective lens 111 is small. Therefore, it is possible to increase the magnification as well as increase the numerical aperture NA of each individual objective lens. Consequently, the collection efficiency, i.e. the proportion of the amount of light collected through the objective lens to the entire amount of signal light emitted from the sample within one observation area, becomes high, and the measurement sensitivity also becomes high.

In the present embodiment, since the filter 14 consists of a plurality of plate members, the area of the filter per plate member can be smaller than in the case of a filter consisting of a single plate member. Therefore, it is easier to improve the surface accuracy of the filter and thereby reduce the production cost. Furthermore, since there are two laser sources each of which casts irradiation light onto one half of the plurality of objective lenses 111, the intensity of the irradiation light is higher than in the case of casting the irradiation light from a single laser source onto all objective lenses 111. Consequently, the intensity of the signal light becomes high, and the measurement sensitivity also becomes high. Although two irradiation beams are used in the present embodiment, three or more irradiation beams may be used.

(1-3) Results of Experiment of Fluorescence and Raman Scattering Light Measurements Using Multifocal Spectrometric Measurement Device According to First Embodiment An experiment to observe fluorescence and Raman scattering light has been performed using the multifocal spectrometric measurement device 10 according to the first embodiment. In the experiment, 96 wells arranged in 8 rows and 12 columns in the multiwell MW were used as measurement areas. The objective lenses 111, second lenses 121 and spectrograph input sections 151 were also arranged in 8 rows and 12 columns. As the sample S, rhodamine 6G was used in the fluorescence measurement, and ethanol in the Raman scattering light measurement. In each measurement, the same kind of sample was placed in all of the 96 wells. The group of wells in which the sample was placed in the experiment corresponds to only a portion of the entire multiwell MW. However, the entire observation area formed by the group of 96 observation areas had a considerable size of 36.0 mm by 54.0 mm, which is approximately $10^7$ times the entire observation area in the case of Patent Literature 1.

FIG. 4 shows the experimental results. FIG. 4A shows the result of the fluorescence measurement, while FIG. 4B shows that of the Raman scattering light measurement. In both FIGS. 4A and 4B, the upper photograph shows an image of the diffracted light from the diffraction grating, taken with a CCD camera in the spectrograph 17. Each photograph shows 96 lines vertically arranged, each line extending horizontally with varying light-dark levels. Each of the 96 lines shows a fluorescence spectrum (FIG. 4A) or Raman scattering spectrum (FIG. 4B) of the signal light from a different well. The horizontal position corresponds to the wavelength of the diffracted light. The light-dark level of the line indicates the intensity of the spectrum. The graph in the lower portion of each of FIGS. 4A and 4B is a graphical representation of the fluorescence spectrum or Raman scattering spectrum on the fourteenth line from the top in the upper photograph. Those photos and graphs demonstrate that clear spectra of the fluorescence and Raman scattering light could be obtained with the multifocal spectrometric measurement device 10 according to the first embodiment.

(2) Multifocal Spectrometric Measurement Device According to Second Embodiment

Figure 5:
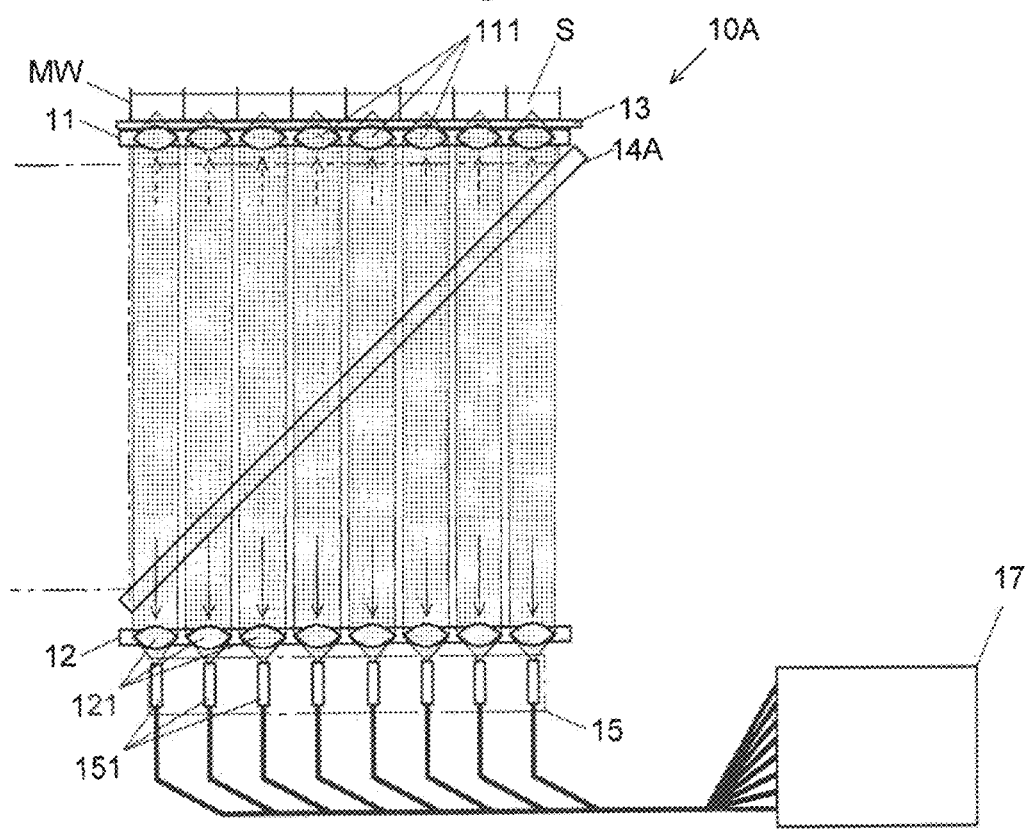
FIG. 5 is a schematic configuration diagram showing the second embodiment of the multifocal spectrometric measurement device according to the present invention.

A multifocal spectrometric measurement device 10A according to the second embodiment is hereinafter described using FIG. 5. In the present multifocal spectrometric measurement device 10A, a filter 14A consisting of a single quadrilateral plate member is provided at an angle of 45 degrees to the optical axes of the objective lenses 111 in such a manner that the plate member covers all objective lenses 111, in place of the filter 14 of the multifocal spectrometric measurement device 10 in the first embodiment. Only one light source 19 is used. The laser light from the light source 19 is cast onto the filter 14A at the entire surface which faces the objective lens array 11. After being reflected by the filter 14A, the light falls onto each objective 111. Except this filter 14A, the configuration and operation of the multifocal spectrometric measurement device 10A according to the second embodiment are identical those of the multifocal spectrometric measurement device 10 in the first embodiment.

A comparison of the multifocal spectrometric measurement device 10A according to the second embodiment with the multifocal spectrometric measurement device 10 according to the first embodiment demonstrates that the former device is favorable for reducing the filter-production cost by improving the surface accuracy due to the use of the filter consisting of the plate members having a smaller area, as well as for increasing the signal-light intensity by increasing the intensity of the irradiation light. The latter device is favorable for simplifying the device configuration.

(3) Multifocal Spectrometric Measurement Device According to Third Embodiment

Figure 6:
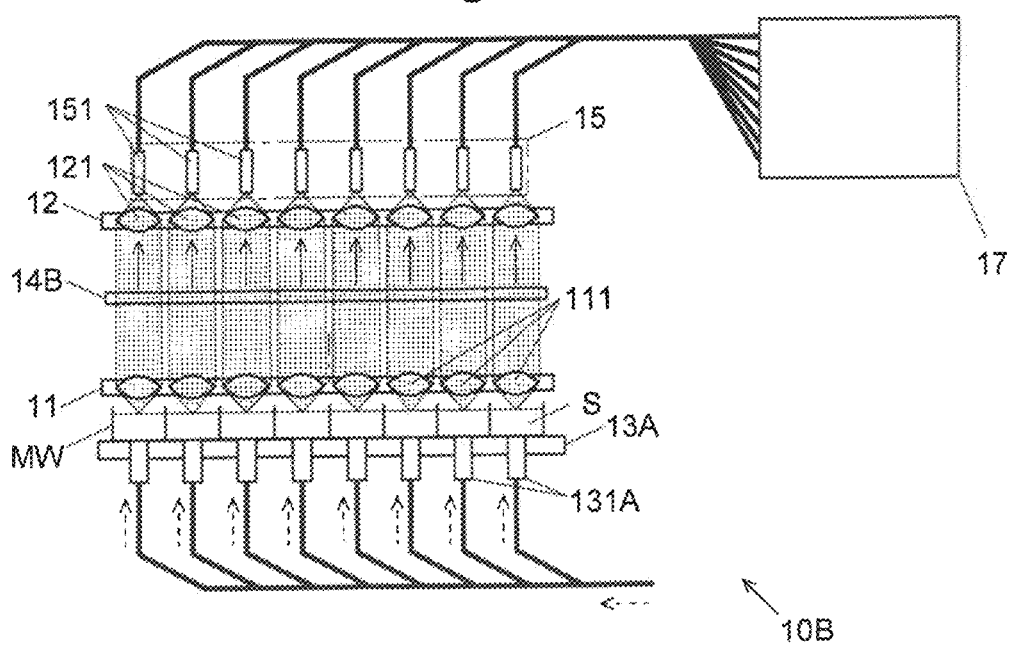
FIG. 6 is a schematic configuration diagram showing the third embodiment of the multifocal spectrometric measurement device according to the present invention.

A multifocal spectrometric measurement device 10B according to the third embodiment is hereinafter described using FIG. 6. The multifocal spectrometric measurement device 10B in the present embodiment has a configuration for casting the irradiation light onto samples S from the back side (the side opposite to the objective lens array 11) of the multiwell MW, using a multiwell MW made of a material which is transparent to the irradiation light. The multifocal spectrometric measurement device 10B has irradiation light output ends 131A arranged in a matrix form at the same intervals as the wells in the multiwell MW. Each irradiation light output end 131A is the output end of an optical fiber which is different from the one provided in the spectrograph input section 151. A light source (not shown) is provided so that the irradiation light is delivered to the inlet ends of those optical fibers. The irradiation light output ends 131A are embedded in the sample holder 13A, with their end faces exposed on the top surface of the sample holder 13A.

Between the objective lens array 11 and the second lens array 12 in the multifocal spectrometric measurement device 10B, a filter 14B consisting of a plate member arranged perpendicular to the optical axes of the objective lenses 111 is provided. Unlike the filters in the first and second embodiments, the filter 14B in the present embodiment does not directly receive irradiation light from the light source, yet performs a similar function; i.e. the filter 14B allows the signal light to pass through, while removing the irradiation light which exits from the irradiation light output ends 131A and reaches the filter 14B after passing through the wells.

Except the light source, irradiation light output ends 131A, sample holder 13A and filter 14B mentioned thus far, the configuration of the multifocal spectrometric measurement device 10B is identical that of the multifocal spectrometric measurement device 10 in the first embodiment.

In the multifocal spectrometric measurement device 10B according to the present embodiment, the irradiation light is cast from the irradiation light output ends 131A onto the samples S in the wells without passing through the objective lenses 111. In the present embodiment, the irradiation light is cast from the irradiation light output ends 131A onto the samples S without being condensed. However, it is also possible to cast the irradiation light onto the samples S through lenses (which are different from the objective lenses 111) by providing those lenses between the irradiation light output ends 131A and the wells. The signal light generated from each sample S irradiated with the irradiation light is collected by the objective lens 111 which faces the sample. After passing through the filter 14B, the signal light reaches the second lens 121. Subsequently, the signal light is guided from the second lens 121 through the spectrograph input section 151 to be eventually dispersed into a spectrum by the spectrograph 17, as in the multifocal spectrometric measurement device 10 according to the first embodiment.

In the multifocal spectrometric measurement device 10B according to the present embodiment, the irradiation light is directly cast from the irradiation light output ends 131A onto the closely positioned wells, using the optical fibers. Therefore, the irradiation light can be used with a minimum of waste.

Figure 7A:
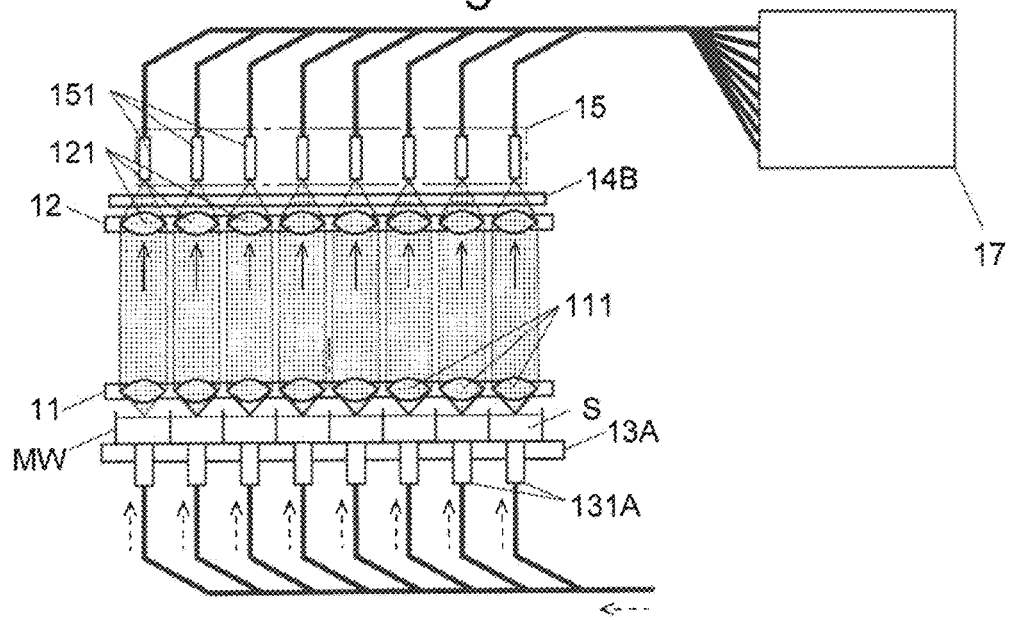
FIGS. 7A-7C are schematic configuration diagrams showing variations of the multifocal spectrometric measurement device according to the third embodiment.
Figure 7B:
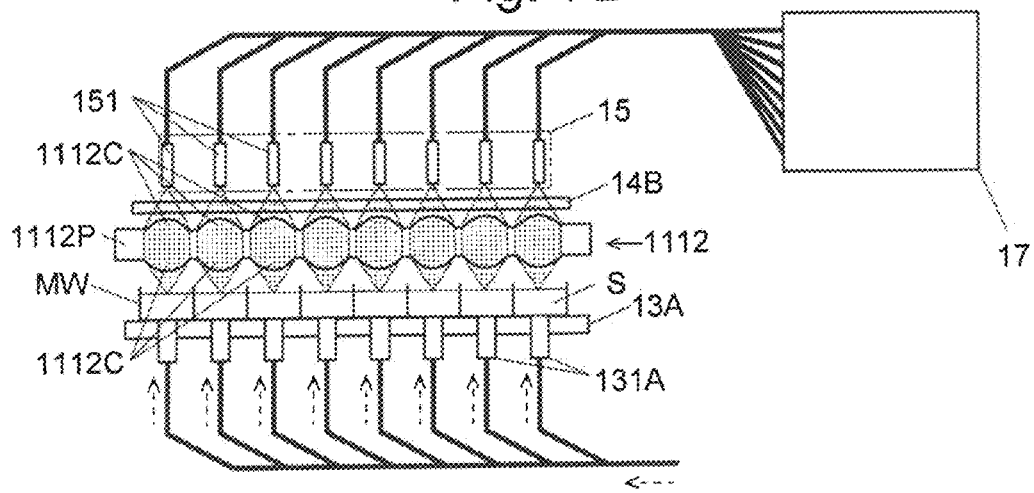
Figure 7C:
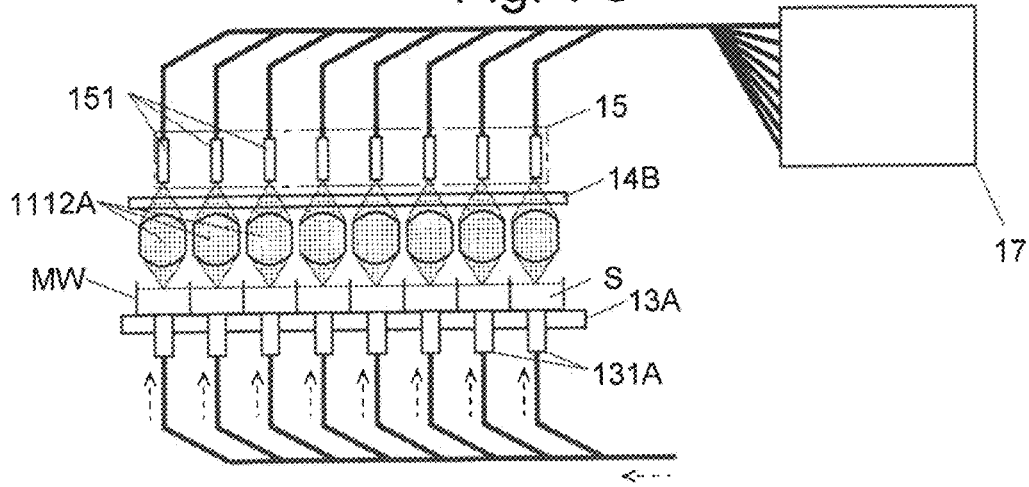

In the multifocal spectrometric measurement device 10B according to the present embodiment, the filter 14B may be provided between the second lens array 12 and the spectrograph input sections 151 (FIG. 7A), instead of providing it between the objective lens array 11 and the second lens array 12. In any case, the irradiation light from the light source is removed by the filter 14B and does not enter the spectrograph input sections 151. If the filter 14B is provided between the second lens array 12 and the spectrograph input sections 151, then, as shown in FIG. 7B, a double-sided lens array 1112 can be used, which is a single part including an objective lens array and a second lens array. The double-sided lens array 1112 consists of a plate member 1112P which is transparent to the signal light, with a plurality of convex portions 1112C formed on both obverse and reverse sides so as to face each other. Alternatively, as shown in FIG. 7C, an array of double-sided lenses 1112A may be used, each of which is a single part including one objective lens 111 and one second lens 121.

(4) Multifocal Spectrometric Measurement Device According to Fourth Embodiment

Figure 8:
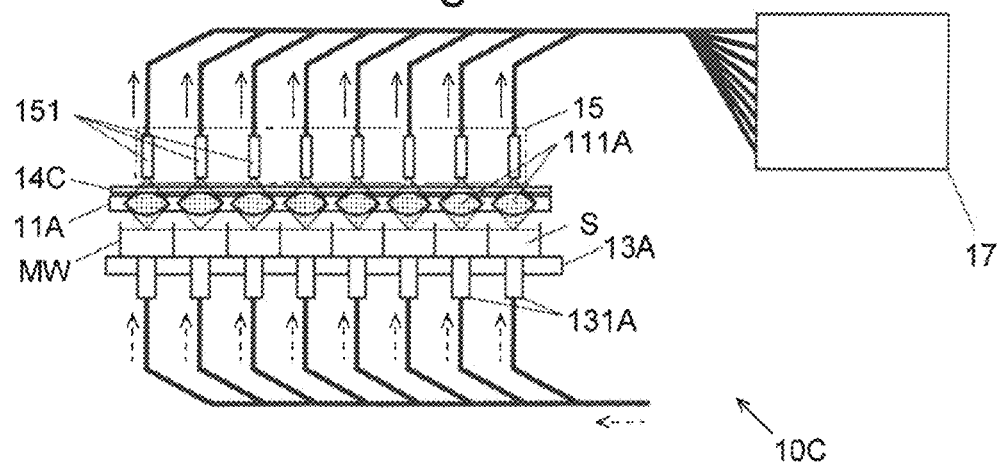
FIG. 8 is a schematic configuration diagram showing the fourth embodiment of the multifocal spectrometric measurement device according to the present invention.

A multifocal spectrometric measurement device 10C according to the fourth embodiment is hereinafter described using FIG. 8. In the multifocal spectrometric measurement device 10C according to the present embodiment, an objective lens array 11A (which will be hereinafter described) is used in place of the objective lens array 11 in the multifocal spectrometric measurement device 10B according to the third embodiment. The objective lens array 11A has a plurality of objective lenses 111A arranged in a manner similar to the objective lenses 111 of the objective lens array 11 in the third embodiment. Each objective lens 111A collects signal light from the sample S in the well (observation area) which faces the lens, and focuses the signal light on the focal point on the side opposite to the well. At this focal point, the corresponding spectrograph input section 151 is placed. Between the objective lenses 111A and the spectrograph input sections 151, a filter 14C which allows the signal light to pass through while blocking the irradiation light is placed, but no second lens is provided. Except the features described so far, the multifocal spectrometric measurement device 10C according to the fourth embodiment has the same configuration as the multifocal spectrometric measurement device 10B according to the third embodiment.

The operation of the multifocal spectrometric measurement device 10C according to the present embodiment is identical to that of the multifocal spectrometric measurement device 10B according to the third embodiment except the operation of the objective lenses 111A as well as the omission of the second lenses. Due to the omission of the second lenses, the multifocal spectrometric measurement device 10C according to the present embodiment can be constructed in a simpler form.

(5) Multifocal Spectrometric Measurement Device According to Fifth Embodiment

Figure 9:
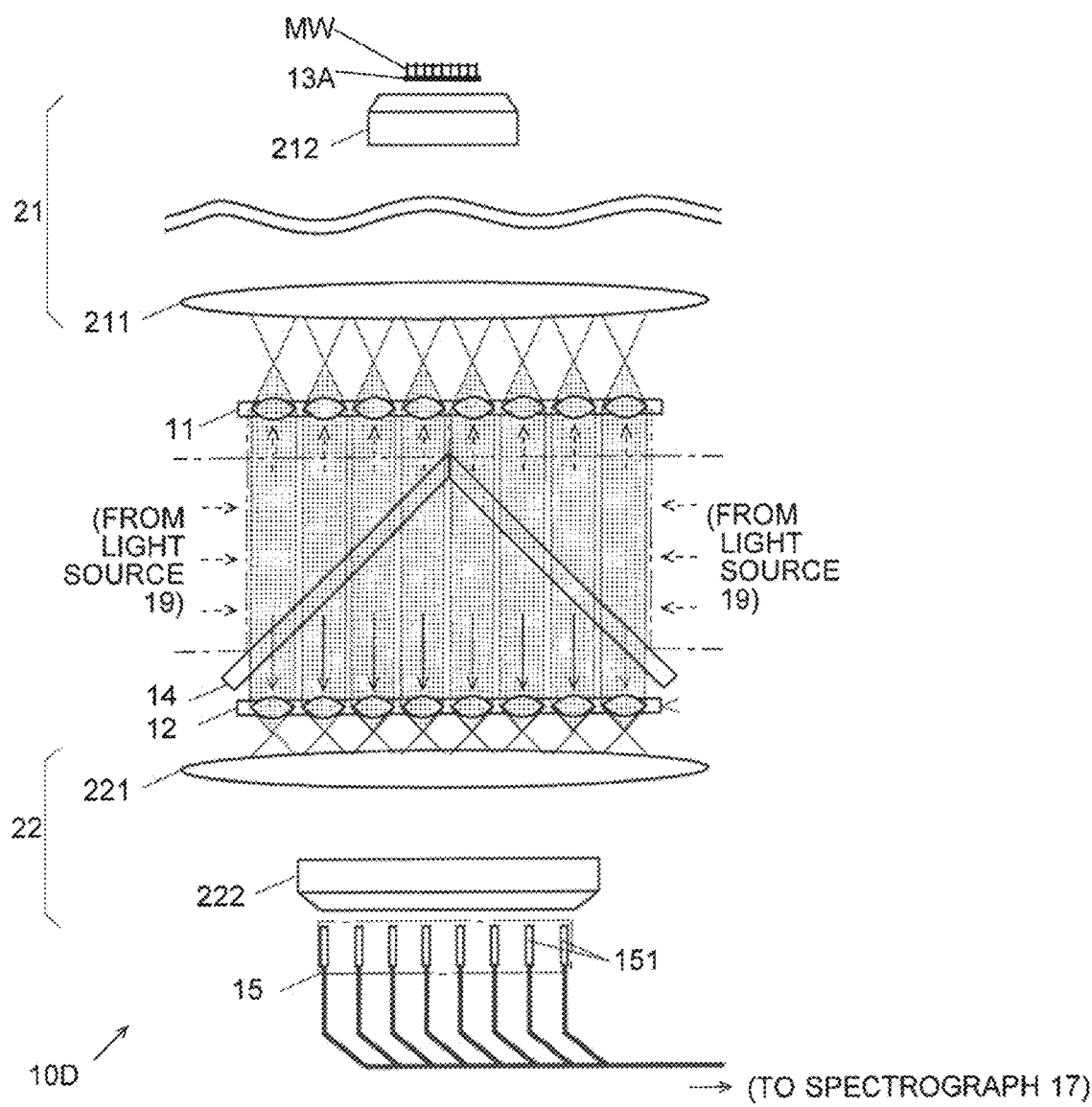
FIG. 9 is a schematic configuration diagram showing the fifth embodiment of the multifocal spectrometric measurement device according to the present invention.
Figure 12:
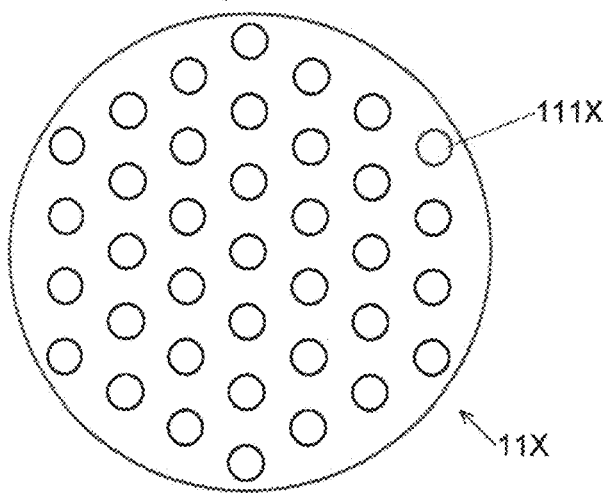
FIG. 12 is a plan view showing a variation of the arrangement of the objective lenses in the multifocal spectrometric measurement device according to the present invention.

A multifocal spectrometric measurement device according to the fifth embodiment is shown using FIG. 9. The multifocal spectrometric measurement device 10D in the present embodiment includes a magnification-converting section 21 consisting of a pair lenses (light-condensing sections) 211 and 212 between the objective lens array 11 and the sample holder 13A. The magnification-converting section 21 enlarges the image of the signal light from the samples held in the sample holder 13A and introduces it to the objective lens array 11. By this system, samples with small observation areas can be observed. The multifocal spectrometric measurement device 10D also includes a spectrograph-input-section-side magnification-converting section 22 consisting of a pair of lenses (light-condensing sections) 221 and 222 placed between the second lens array 12 and the spectrograph-input-section assembly 15, for reducing the image of the signal light from the objective lenses. This allows the objective lens array and the second lens to be larger in size than the spectrograph input section 151 which is the inlet end of an optical fiber. Providing the multifocal spectrometric measurement device 10D with only either the magnification-converting sections 21 or the spectrograph-input-section-side magnification-converting section 22 is also possible. For a sample with a large observation area, a magnification-converting section which reduces the image of the signal light from the sample may be used in place of the aforementioned magnification-converting section 21. A spectrograph-input-section-side magnification-converting section which enlarges the image of the signal light from the objective lenses may also be used in place of the aforementioned spectrograph-input-section-side magnification-converting section 22.

(6) Multifocal Spectrometric Measurement Device According to Sixth Embodiment

A multifocal spectrometric measurement device according to the sixth embodiment is shown using FIG. 10. The multifocal spectrometric measurement device 10E in the present embodiment includes a moving means for moving the sample holder 13B in the horizontal direction in FIG. 10 as well as in the direction perpendicular to the plane of paper. The multiwell MW placed on the sample holder 13B has a sufficiently large number of wells compared to the number of objective lenses 111 in the objective lens array 11. The multifocal spectrometric measurement device 10E having such a moving means can perform an analysis for a larger number of samples. By an automatic control of the moving means, an automatic high-speed measurement of a large number of samples can be performed. A spectroscopic imaging measurement of a large-size sample can be performed by placing the sample on the sample holder 13B in place of the multiwell MW. Instead of moving the sample holder 13B as in the present multifocal spectrometric measurement device 10E, the objective lens array 11, second lens array 12, spectrograph-input-section assembly 15 and filter 14 may be moved as one unit.

(7) Variations

The multifocal spectrometric measurement device according to the present invention is not limited to the previous embodiments.

For example, in any of the previous embodiments, the objective lenses 111 (111A) are provided so that one lens faces each sample S contained in the well. It is also possible to provide one objective lens for each of a plurality of observation areas on a single sample. In this case, the second lenses and the spectrograph input sections should be provided so that one lens and one section correspond to one objective lens.

In the first embodiment, a multiwell MW having a bottom wall made of a material transparent to both irradiation light and signal light is used, and the irradiation light is cast from the bottom side onto the samples S. Alternatively, as shown in FIG. 11, the irradiation light may be cast from the top side of the multiwell MW onto the samples S. In this case, a multiwell MW having a non-transparent bottom wall can be used. Similarly, in the second embodiment, the irradiation light may be cast from the top side of the multiwell MW onto the samples S.

In the first embodiment, a total of two light sources 19 corresponding to the two plate members in the filter 14 are used, with one light source for each plate member. It is also possible to divide the light from a single light source into two beams and cast one beam onto each of the two plate members. This reduces the number of light sources 19 used and lowers the device cost. The use of the filter consisting of plate members having a smaller area improves the surface accuracy and thereby reduces the cost of the filter production, as noted in the first embodiment. It is also possible to divide the light from a single light source into three or more beams and cast them onto the same number of plate members in the filter, with one beam onto each plate member.

In any of the previous embodiments, the objective lenses 111 (111A) are arranged in a matrix form. It is also possible to arrange them in a non-matrix form according to the observation areas on the sample or samples. For example, the objective lenses may be arranged in a triangular lattice form (FIG. 12), in a radial form, or at random positions. Arranging the objective lenses in a row is also possible. The objective lens array 11X in which the objective lenses 111X are arranged in a triangular lattice form can be used for a multiwell in which a number of regular hexagonal wells are arranged. In this objective lens array 11X, the entire area where the objective lenses 111X are arranged has an approximately circular shape. Therefore, a laser beam having a circular cross section generated from a light source can be efficiently cast onto that area as the irradiation light.

In any of the previous embodiments, no optical element other than the filter 14 (14A or 14B), second lens 121, magnification-converting section 21 and spectrograph-input-section-side magnification-converting section 22 is placed within the space between the objective lenses 111 (111A) and the corresponding spectrograph input sections 151. However, the present invention does not exclude the possibility of arranging another optical system, such as a reflector or lens, within that space. In any of the first through third embodiments, the second lenses 121 are arranged so as to face the objective lenses 111, and the spectrograph input sections 151 are arranged so as to face the second lenses 121; and in the fourth embodiment, the spectrograph input sections 151 are arranged so as to face the objective lenses 111. These mutually facing relationships do not need to be present if the aforementioned optical system, such as a reflector or lens, is present within the space between the objective lenses 111 (111A) and the corresponding spectrograph input sections 151.

In any of the previous embodiments, the light source 19 for casting irradiation light onto the samples S is used. It is unnecessary to use the light source 19 if the signal light can be obtained without irradiating the sample with light, as in the case of the signal light generated by chemiluminescence.

(8) Another Example of Spectrograph

Figure 13A:
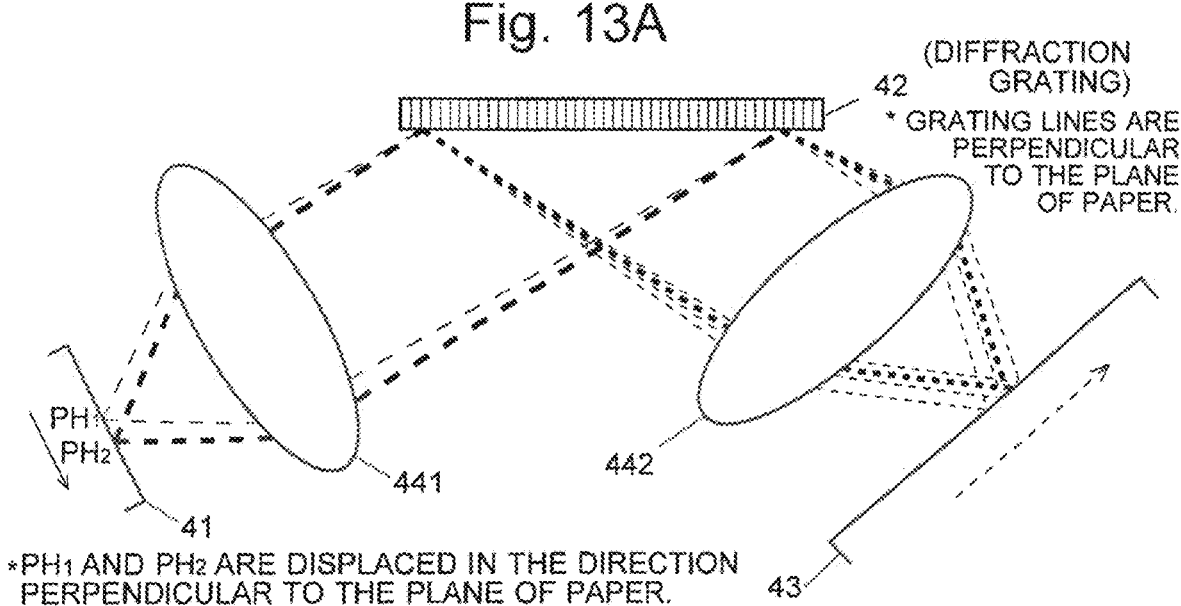
FIG. 13A is a schematic configuration diagram showing one example of the spectrograph to be used in the multifocal spectrometric measurement device in each embodiment and other multifocal spectrometric measurement devices.
Figure 13B:
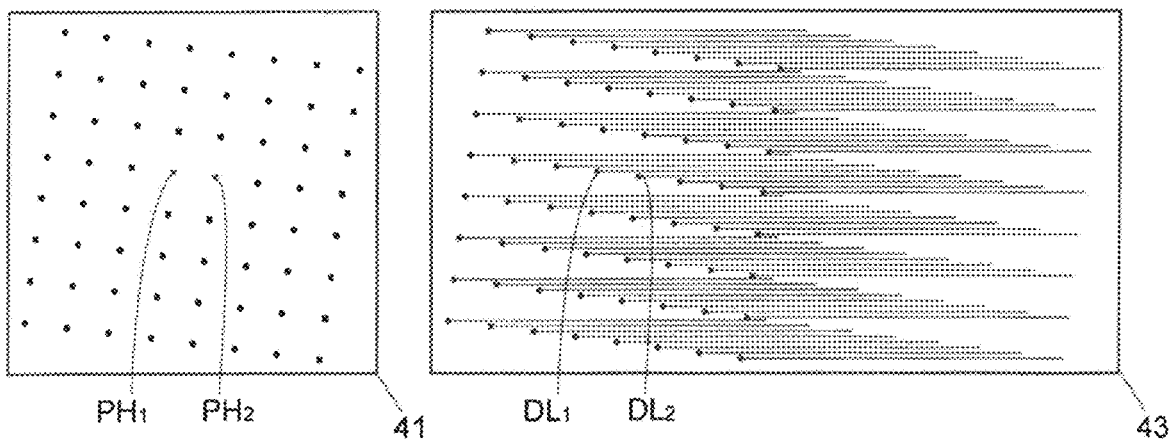
FIG. 13B is a diagram showing beams of signal light exiting from a pinhole array and beams of diffracted light incident on a photodetector.

The spectrograph used in the previous embodiments is of the same type as described in Patent Literature 1. Hereinafter described is another example of the configuration of the spectrograph. FIGS. 13A and 13B are schematic configuration diagrams of the present spectrograph. This spectrograph has a diffraction grating 42. FIG. 13A is a view from one direction parallel to the surface of the diffraction grating 42. The diffraction grating 42 has grating lines extending in the direction perpendicular to the plane of paper of the drawing. In the previous stage to the diffraction grating 42, a pinhole array 41 having a matrix of pinholes for allowing signal light exiting from the second lenses 121 of the second lens array 12 to pass through is provided. The pinhole array 41 corresponds to the spectrograph input sections mentioned earlier. Referring to FIG. 13A, there are two pinholes $PH_1$ and $PH_2$ neighboring each other in the direction indicated by the arrowed solid line in FIG. 13A. These two pinholes $PH_1$ and $PH_2$ are displaced from each other in the direction perpendicular to the plane of paper of the drawing. The line connecting these two pinholes $PH_1$ and $PH_2$ corresponds to one row of the matrix in which pinholes are arranged. Therefore, this row is inclined to the plane of paper of the drawing (i.e. it is neither parallel nor perpendicular to the plane of paper). On the other hand, the dispersing direction of the wavelength at the diffraction grating 42 is perpendicular to the grating lines, or parallel to the plane of paper of the drawing. Accordingly, the rows of the matrix are non-parallel to the dispersing direction of the wavelength at the diffraction grating 42. The same applies to the columns of the matrix. A lens 441 is provided between the pinhole array 41 and the diffraction grating 42. The signal light which has passed through each pinhole forms a spreading beam, which is subsequently collimated by the lens 441 and falls onto the diffraction grating 42. On the surface of the diffraction grating 42, the signal light is diffracted at a different angle depending on its wavelength. Each diffracted light is focused on a photodetector 43 by a lens 442.

In FIG. 13A, signal light from pinhole $PH_1$ is represented by thin broken lines, while signal light from pinhole $PH_2$ is represented by thick broken lines. For pinhole $PH_1$, three kinds of signal light with different wavelengths are shown as an example, and each beam of light resulting from the diffraction of the three kinds of signal light by the diffraction grating 42 is represented by thin broken lines. Those beams of diffracted light having different wavelengths fall onto the photodetector 43 at positions displaced from each other in the direction indicated by the arrowed broken line in FIG. 13A. FIG. 13B illustrates how the incidence of light onto the photodetector 43 occurs, taking the example of the beams of light produced by diffracting signal light coming from a large number of pinholes. Since the rows and columns of the matrix in the pinhole array 41 are non-parallel to the grating lines of the diffraction grating 42, the beams of light produced by diffracting the signal light from the pinholes are displaced from each other in the vertical direction of the figure. On the other hand, each beam of diffracted light (for example, diffracted light $DL_1$ for pinhole $PH_1$ and diffracted light $DL_2$ for pinhole $PH_2$ are indicated in FIG. 13B) is detected in a horizontally expanded form in the figure according to wavelengths. Thus, the beams of diffracted light coming from different pinholes are vertically displaced from each other, with each ray extending in the horizontal direction. Therefore, they can be detected without overlapping each other.

Figure 14A:
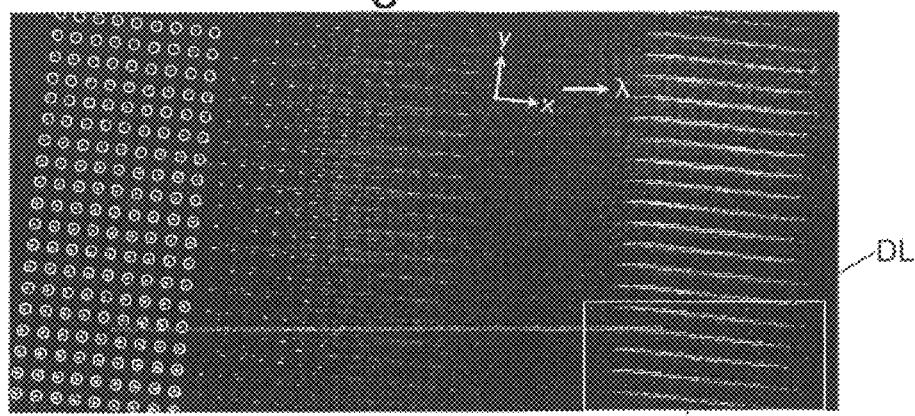
FIG. 14A is a CCD image showing the result of a simultaneous dispersion of a plurality of beams of signal light using the spectrograph shown in FIG. 13.
Figure 14B:
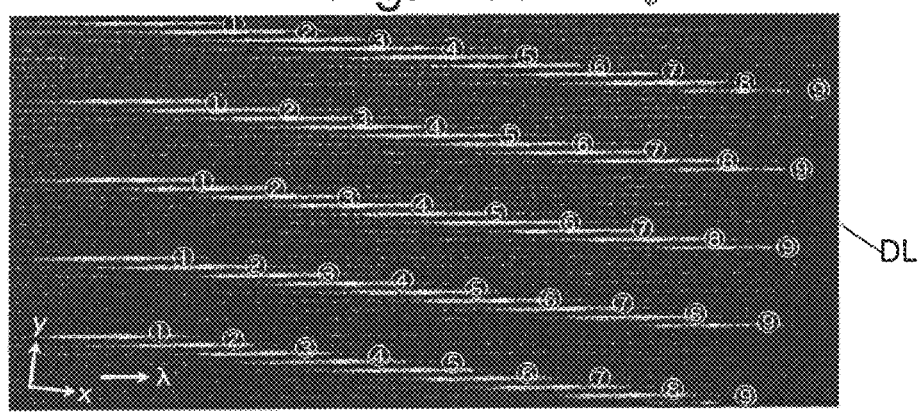
FIG. 14B is a partially enlarged image of the same CCD image.
Figure 14C:
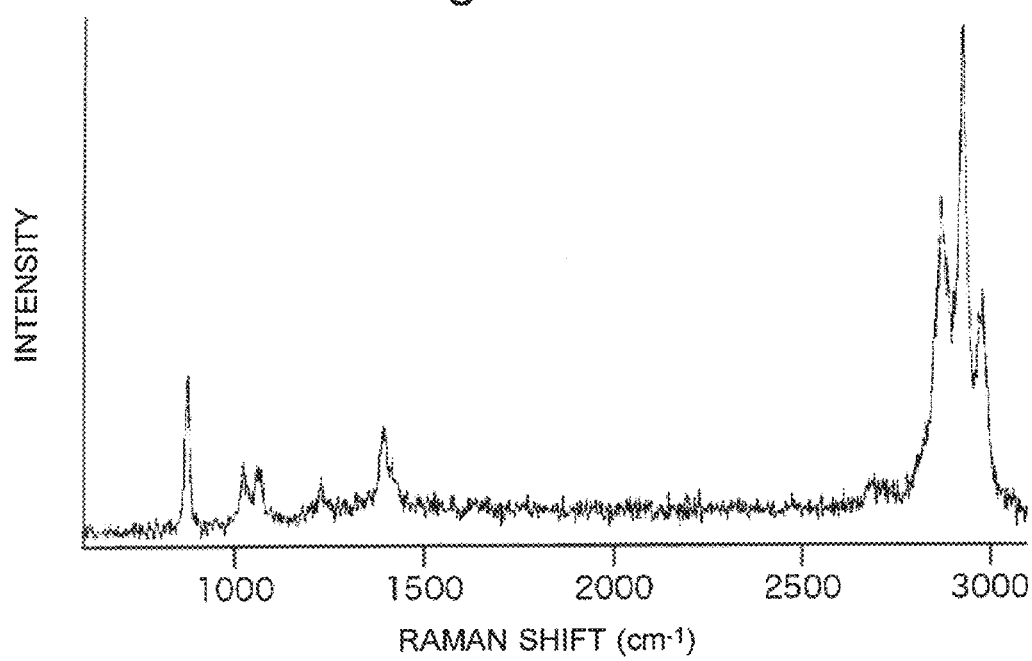
FIG. 14C is an extracted spectrum.

FIGS. 14A and 14B show images, taken with a CCD camera, of spectra simultaneously produced from a plurality of beams of signal light using the spectrograph shown in FIGS. 13A and 13B. In FIG. 14A, the beams of diffracted light DL incident on the photodetector 43 are visible in the image. FIG. 14B is an enlargement of the beams of diffracted light DL included in the region indicated by the white frame in FIG. 14A. This image demonstrates that the components of each diffracted light DL are projected at different horizontal positions in the image depending on their wavelengths, while the beams of diffracted light DL originating from different samples are vertically separated from each other in the image. Each beam of diffracted light DL in FIGS. 14A and 14B has an intensity distribution in the horizontal direction of those figures. By graphically representing this intensity distribution, a wavelength spectrum can be obtained, as shown by an example in FIG. 14C.

Figure 15:
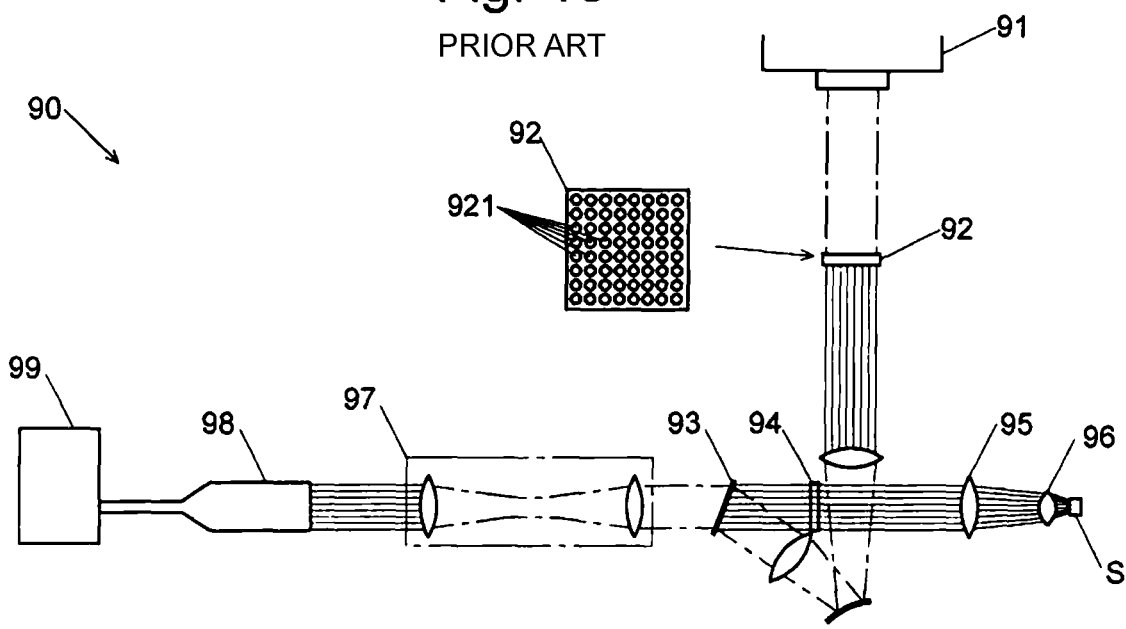
FIG. 15 is a schematic configuration diagram showing one example of a conventional multifocal spectrometric measurement device.

In the spectrograph shown in FIGS. 13A and 13B, a prism may be used in place of the diffraction grating 42. The spectrograph shown in FIGS. 13A and 13B can also be used in a conventional type of simultaneous multipoint (multifocal) spectrometric measurement device, such as the devices described in Patent Literature 1 or 2. In that case, the fiber bundle 98 (FIG. 15), with the output ends rearranged in a matrix form, can be used as the spectrograph input sections.

REFERENCE SIGNS LIST 10, 10A, 10B, 10C, 10D, 10E . . . Multifocal Spectrometric Measurement Device
11, 11A, 11P, 11X . . . Objective Lens Array (Objective Light-Condensing-Section Array)
111, 111A, 111X . . . Objective Lens (Objective Light-Condensing Section)
111C, 1112C . . . Convex Portion of Lens Array
1112P, 112 . . . Plate of Lens Array
1112 . . . Double-Sided Lens Array
1112A . . . Double-Sided Lens
12 . . . Second Lens Array (Spectrograph-Side Lens Array; Spectrograph-Side Light-Condensing-Section Array)
121 . . . Second Lens (Spectrograph-Side Lens; Spectrograph-Side Light-Condensing Section)
13, 13A, 13B . . . Sample Holder (Sample Placement Section)
131A . . . Irradiation Light Output End
14, 14A, 14B, 14C . . . Filter
15 . . . Spectrograph-Input-Section Assembly
151 . . . Spectrograph Input Section
17 . . . Spectrograph
19, 91 . . . Laser Source
191 . . . Diameter-Increasing Optical System
1911 . . . Diameter-Increasing Lens
1912 . . . Parallel Beam Formation Lens
21 . . . Magnification-Converting Section
211 . . . Lens (Light-Condensing Section) of Magnification-Converting Section
22 . . . Spectrograph-Input-Section-Side Magnification-Converting Section
221 . . . Lens (Light-Condensing Section) of Spectrograph-Input-Section-Side Magnification-Converting Section
41 . . . Pinhole Array (Spectrograph Input Section)
42 . . . Diffraction Grating
43 . . . Photodetector
441, 442 . . . Lens
90 . . . Conventional Multifocal Spectrometric Measurement Device
92 . . . Microlens Array
921 . . . Microlens
93 . . . Edge Filter
94 . . . Pinhole Array
95 . . . Relay Lens
96 . . . Objective Lens in Conventional Multifocal Spectrometric Measurement Device
97 . . . Lens System
98 . . . Fiber Bundle
99 . . . Spectrograph
DL, $DL_1$, $DL_2$ . . . Diffracted Light
MW . . . Multiwell
$PH_1$, $PH_2$ . . . Pinhole
S . . . Sample

The invention claimed is:

1. A multifocal spectrometric measurement device comprising:
    a spectrograph;
    a plurality of objective light-condensing sections individually located at positions which respectively and optically face a plurality of observation areas on a sample or samples placed in a sample placement section;
    spectrograph input sections provided in such a manner that each of the plurality of objective light-condensing sections has one corresponding spectrograph input section, configured to introduce signal light passing through the corresponding objective light-condensing sections into the spectrograph; and
    spectrograph-side light-condensing sections provided between the objective light-condensing sections and the corresponding spectrograph input sections, in such a manner that each of the plurality of objective light-condensing sections has one corresponding spectrograph-side light-condensing section,
wherein:
    a point in the observation area optically facing each of the objective light-condensing sections is located at a position on which a parallel beam incident on the objective light-condensing section from a side where the corresponding spectrograph-side light-condensing section is located is focused;
    the spectrograph input section corresponding to each of the spectrograph-side light-condensing sections is located at a position on which the signal light is focused after passing through the spectrograph-side light-condensing section; and
    the objective light-condensing sections and the spectrograph-side light-condensing sections are arranged so that the signal light between each of the objective light-condensing section and the corresponding spectrograph-side light-condensing section becomes a parallel beam.

2. The multifocal spectrometric measurement device according to claim 1, further comprising a light source configured to cast, onto the sample or samples, irradiation light which causes an emission of the signal light from the sample or samples by irradiating the sample or samples.

3. The multifocal spectrometric measurement device according to claim 2, wherein the light source is placed at a position from which the irradiation light is cast through the objective light-condensing sections onto the sample or samples.

4. The multifocal spectrometric measurement device according to claim 3, further comprising a filter placed between the sample placement section and the spectrograph input sections, that allows light having a wavelength of the signal light to pass through while reflecting light having a wavelength of the irradiation light.

5. The multifocal spectrometric measurement device according to claim 4, wherein the filter is arranged so that a plurality of beams of the irradiation light are incident on the filter and each of the plurality of beams of the irradiation light reflected by the filter is cast onto a different subset of the objective light-condensing sections.

6. The multifocal spectrometric measurement device according to claim 5, wherein a same number of the filters as the number of beams of the irradiation light are provided, and the filters are arranged so that each of the beams of the irradiation light is cast onto a different one of the filters.

7. The multifocal spectrometric measurement device according to claim 4, wherein the filter is arranged between the objective light-condensing sections and the spectrograph input sections so that the irradiation light cast from the light source is reflected by the filter into a direction of optical axes of the objective light-condensing sections.

8. The multifocal spectrometric measurement device according to claim 3, wherein the light source is placed at a position from which the irradiation light is cast onto the sample or samples without passing through the objective light-condensing sections.

9. The multifocal spectrometric measurement device according to claim 8, comprising a filter placed between the sample placement section and the spectrograph input sections, that allows light having a wavelength of the signal light to pass through while removing light having a wavelength of the irradiation light.

10. The multifocal spectrometric measurement device according to claim 1, further comprising an objective-light-condensing-section array in which the plurality of objective light-condensing sections are arranged in a matrix form.

11. The multifocal spectrometric measurement device according to claim 10, further comprising, between the objective-light-condensing section array and the spectrograph input sections, a spectrograph-side light-condensing-section array in which each of the plurality of objective light-condensing sections has one spectrograph-side light-condensing section optically facing, wherein, for each of the objective light-condensing sections, a point which optically faces the objective light-condensing section is located within the observation area at a position on which the signal light between the objective light-condensing section and the spectrograph-side light-condensing section is focused after passing through the objective light-condensing section, and the spectrograph input section corresponding to the objective light-condensing section is located at a position on which the signal light is focused after passing through the spectrograph-side light-condensing section.

12. The multifocal spectrometric measurement device according to claim 1, further comprising a magnification-converting section placed between the plurality of observation areas and the plurality of objective light-condensing sections, configured to change a size of an image formed by the signal light from each of the plurality of observation areas.

13. The multifocal spectrometric measurement device according to claim 1, further comprising a spectrograph-input-section-side magnification-converting section placed between the spectrograph-side light-condensing sections and the spectrograph input sections, configured to change a size of an image formed by the signal light from the objective light-condensing sections corresponding to the spectrograph-side light-condensing sections.

14. The multifocal spectrometric measurement device according to claim 1, wherein:
the spectrograph input sections are arranged at matrix points in such a manner that each of the plurality of objective light-condensing sections has one corresponding spectrograph input section; and
rows and columns of the matrix are non-parallel to a wavelength-dispersing direction of a dispersing element included in the spectrograph.

15. The multifocal spectrometric measurement device according to claim 1, further comprising a moving means for changing a relative position of the sample or samples and the plurality of objective light-condensing sections along a plane containing the sample or samples placed in the sample placement section.

16. An optical system to be used in a multifocal spectrometric measurement device in which beams of signal light emitted from a plurality of predetermined observation areas on a sample or samples placed in a sample placement section are introduced into a spectrograph via spectrograph input sections and thereby dispersed into spectra, the optical system comprising:
a plurality of objective light-condensing sections configured to be installed in the multifocal spectrometric measurement device in such a manner as to be individually placed at positions which respectively and optically face the plurality of observation areas; and
spectrograph-side light-condensing sections provided between the objective light-condensing sections and the spectrograph input sections, in such a manner that each of the plurality of objective light-condensing sections has one corresponding spectrograph-side light-condensing section,
wherein:
a point in the observation area optically facing each of the objective light-condensing sections is located at a position on which a parallel beam incident on the objective light-condensing section from a side where the corresponding spectrograph-side light-condensing section is located is focused;
the spectrograph input section corresponding to each of the spectrograph-side light-condensing sections is located at a position on which the signal light is focused after passing through the spectrograph-side light-condensing section; and
the objective light-condensing sections and the spectrograph-side light-condensing sections are arranged so that the signal light between each of the objective light-condensing section and the corresponding spectrograph-side light-condensing section becomes a parallel beam.

* * * * *